United States Patent
Lim

(10) Patent No.: US 10,243,850 B2
(45) Date of Patent: Mar. 26, 2019

(54) METHOD TO REDUCE PACKET STATISTICS CHURN

(71) Applicant: Nicira, Inc., Palo Alto, CA (US)

(72) Inventor: Harold Vinson C. Lim, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 352 days.

(21) Appl. No.: 15/064,590

(22) Filed: Mar. 8, 2016

(65) Prior Publication Data

US 2017/0264497 A1 Sep. 14, 2017

(51) Int. Cl.
*H04L 12/26* (2006.01)
*H04L 12/741* (2013.01)
*H04L 12/851* (2013.01)

(52) U.S. Cl.
CPC .......... *H04L 45/745* (2013.01); *H04L 43/026* (2013.01); *H04L 47/2483* (2013.01)

(58) Field of Classification Search
None
See application file for complete search history.

(56) References Cited

U.S. PATENT DOCUMENTS

| 2015/0010000 A1* | 1/2015 | Zhang | H04L 45/38 370/392 |
| 2017/0262300 A1* | 9/2017 | Brandwine | G06F 9/455 |

* cited by examiner

*Primary Examiner* — Alex Skripnikov
*Assistant Examiner* — Nicole King
(74) *Attorney, Agent, or Firm* — Adeli LLP

(57) ABSTRACT

A method of collecting statistics for a set of logical entities associated with a flow-based managed forwarding element. A statistics collection flow table is created for collecting statistics for logical entities. For each pair of logical entity and collected statistics type, a flow entry is added to the statistics collection flow table and includes a matching criteria for matching the identification the logical entity and the type of the statistics collected by the flow entry. When a particular statistics for a logical entity is to be updated during the processing of a packet by a flow table, the packet is submitted by the flow table to the statistics collection flow table. The statistics are updated for the logical entity by matching the identification of the logical entity and the particular statistics type with the matching criteria of a flow entry in the statistics collection flow table.

20 Claims, 12 Drawing Sheets

METHOD TO REDUCE PACKET STATISTICS CHURN

BACKGROUND

Network virtualization entails creating logical, virtual networks that are decoupled from the underlying network hardware to ensure the network can better integrate with and support increasingly virtual environments. Some network virtualization platforms use flow based forwarding elements. Each flow is essentially a rule that specifies how the forwarding element should process each packet with certain header field values. The flow includes a set of match fields and at least one action to perform on each packet that has a set of header values that match the set of match field values. Examples of actions include dropping the packet or outputting the packet to one or more of the forwarding element's output ports.

Network virtualization platforms collect statistics for logical entities such as logical ports as well as statistics for interfaces such as virtual network interfaces (VIFs), physical network interfaces (PIFs), tunnels, etc. Some network virtualization platforms provide an application programming interface (API) and/or a user interface (UI) that shows different types of packet statistical counters for configured logical entities (e.g., ingress packet counts and bytes of a logical port, total drop count and bytes of a logical port, packet drop count and bytes of a logical port due to a particular security feature, etc.).

On open vSwitch (OVS) based platforms such as kernel-based virtual machine (KVM) hypervisors, packet statistics are aggregated from flow statistics. Specifically, statistics for each flow is programmed and installed in the forwarding element. Flows for which statistics are collected are programmed by a controller to also include a note action that includes the counter type and a unique identifier (such as universally unique identifier (UUID) of the logical entity). A daemon that runs on the host aggregates these statistics based on the note action before sending them to the management plane of the network virtualization platform. The daemon reads and sums up all flow statistics corresponding to the same unique identifier and counter type.

The flows installed by the controller are dependent on the features and configurations applied to a logical entity (e.g., media access control (MAC) address, distributed firewall, security, etc.). For instance, if address resolution protocol (ARP) snooping is enabled, the controller installs or removes the appropriate flows. Another example is when the MAC address of a logical port changes, then the controller installs new flows (and deletes the corresponding old flows) to reflect the new MAC address. The problem with this method is that flow statistics share the same lifetime of a flow. If a flow is deleted, then the corresponding statistics gets deleted too. This results in possible inaccurate or incomplete packet statistics reported to the management plane.

Previous solutions to ensure that logical entities statistics are accurate, involve adding additional intelligence in the daemon that collects and sends the statistics to the management plane. This requires the daemon to keep track of whether a flow has been churned and properly account for the statistics. This adds additional complexity to the daemon and the daemon has to handle different cases (such as ARP snooping, MAC address changes, etc.) in order to ensure logical entity statistics are accurate.

BRIEF SUMMARY

Some embodiments provide a managed forwarding element (MFE) that operates as a software forwarding element. The MFE performs the packet processing operations such as classification operations, forwarding actions, etc., by using a set of flow tables. In some embodiments, a controller creates a separate flow table dedicated for collecting packet statistics for all logical entities. This flow table, referred to herein as statistics collection flow table, includes one flow entry for each type of statistics that is collected for each logical entity. For instance, if the statistics for a logical port includes the total number of packets and bytes received, the total number of packets and bytes transmitted, and the number of dropped packets due a certain security reason, then the controller includes three flow entries for that logical port in the statistics collection flow table.

The flows in the statistics collection flow table are installed only once by the controller and are only removed from the flow table when the corresponding logical entity is deleted from the network. Each of these flows only matches on two dedicated matching registers. The first matching register matches on the identifier of the logical entity and the second register matches on the statistics counter type. The flows are agnostic to specific configuration of the logical entity and any changes to the logical entity does not cause changes to the flows in the statistics collection flow table. The flows in this table do not have any actions, except for a note action that includes metadata about the logical entity and the type of the statistics collected (e.g., the UUID of the logical entity and the statistics counter type). The note action is used by a daemon to find and extract the statistics of interest.

Instead of directly adding the note actions to the corresponding flows of interest in the MFE pipeline (e.g., adding note actions to flows that performs drops for a packet of a logical entity due to some security feature), these flows first populate the above mentioned dedicated registers and resubmit the packet to the dedicated statistics collection flow table before performing any other actions of the flow. Any time a particular statistics or counter needs to be incremented, the packet is sent to the dedicated statistics collection flow table. The packet will hit one of the flows in this table to increment the statistics, before bouncing back the packet to the original flow and performing the rest of the actions and continuing into the rest of the processing pipeline. The daemon that reports statistics to the management plane only has to read the flow statistics in this dedicated statistics collection flow table and also does not need to do any additional post-processing such as aggregating multiple flow statistics to get the statistics of a particular packet counter type for a logical entity.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In some embodiments, the packet processing operations (e.g., classification operations, forwarding actions, etc.) are performed by a managed forwarding element (MFE) that operates as a software forwarding element. OVS is an example of a flow entry-based software forwarding element. In some embodiments, MFEs operate on host machines that host virtual machines or other data compute nodes that serve as the sources and destinations for packets (e.g., in the virtualization software of such a host machine). For example, an MFE might operate on a host machine that hosts virtual machines for several different logical networks, and would implement the several logical networks for each of the virtual machines residing on the host.

OVS can have a number of flow tables. Each flow table includes a set of flows. Each flow has a set of expressions and actions. Typically, a controller creates a number of flow tables corresponding to different stages (and/or features) in the processing pipeline of a packet. For example, a controller can create a flow table specifically for ingress distributed firewall. The flows installed in this stage can have different expressions to handle the different cases needed in this stage or feature (e.g., match on specific packet type or register). Flow actions can include transformations on the packet/registers/metadata, resubmitting the packet to the same or different flow table for further processing, dropping the packet, etc. Flow actions are sequentially processed by the MFE. OVS allows adding different types of note actions to flows, such as adding a unique identifier or counter type in the note action.

I. Managed Forwarding Element Architecture

Figure 1:
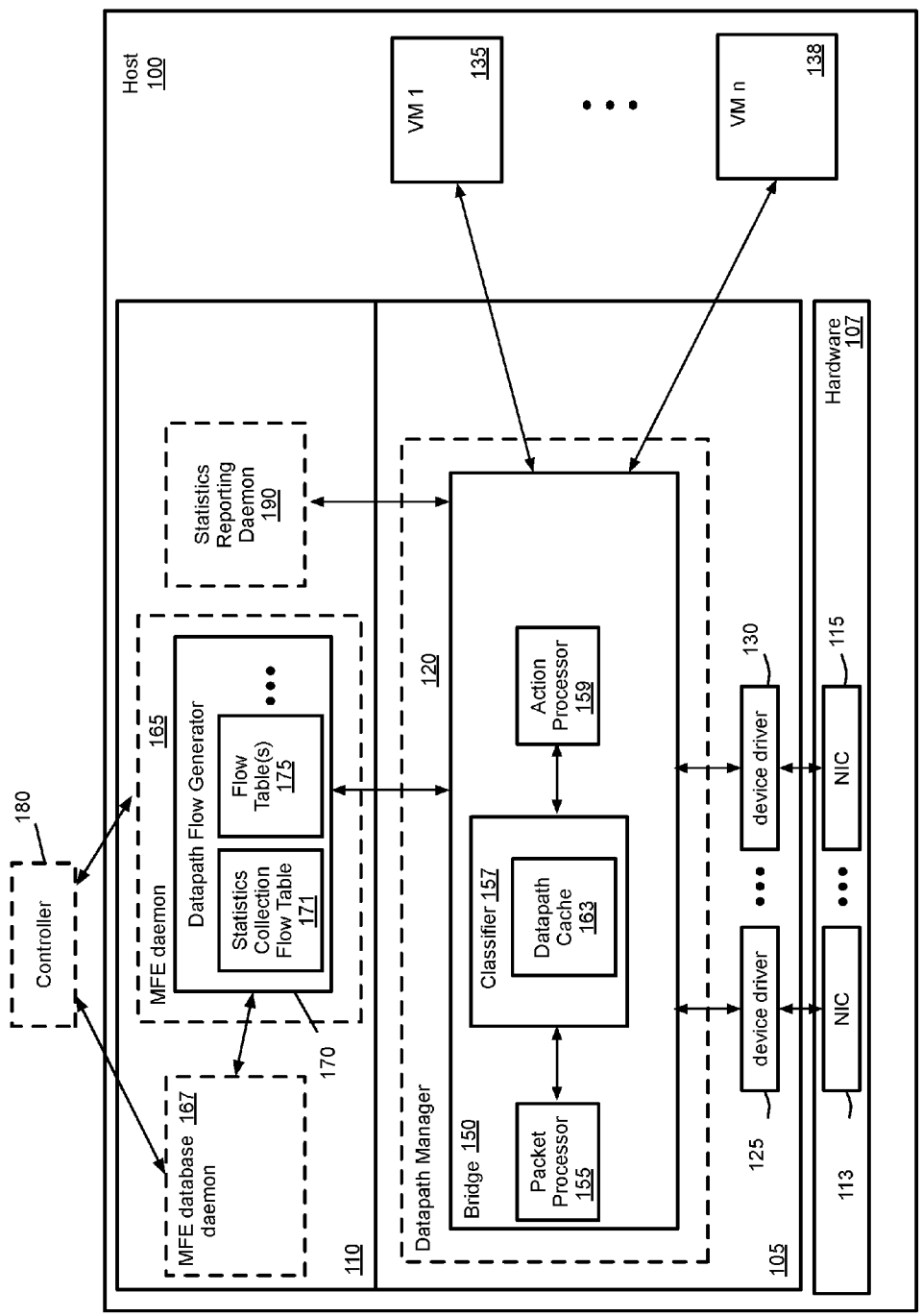
FIG. 1 conceptually illustrates an architectural diagram of a host machine on which a software-implemented managed forwarding element of some embodiments is implemented.

FIG. 1 conceptually illustrates an architectural diagram of a host machine 100 on which a software-implemented MFE of some embodiments is implemented. In some embodiments, the MFE is implemented in the virtualization software (e.g., in the hypervisor) of the host 100. In this example, the MFE includes several components, including a kernel module or datapath manager 120 that has a bridge (or datapath) 150 operating in the virtualization software kernel 105. The MFE also includes an MFE daemon 165, an MFE database daemon 167, and a statistics reporting daemon 190, operating in the user space 110 of the virtualization software.

While this figure and the accompanying descriptions shows the bridge (or datapath) 150 (i.e., the parsing and extraction of packet headers, the lookups against flow entries, and the execution of actions on the packets) operating in the kernel, it should be understood that these could also take place in the user space in some embodiments. That is, in some embodiments, all layers of the packet classification hierarchy run in the user space (possibly within a single user space process).

As shown in FIG. 1, the host 100 includes hardware 107 (although this is a software architecture diagram, the hardware 107 is displayed in order to represent the network interface controllers (NICs) 113-115 of the host machine), virtualization software kernel 105, virtualization software user space 110, and several VMs 135-138. The hardware 107 may include typical computer hardware (e.g., processing units, volatile memory (e.g., RAM), nonvolatile memory (e.g., hard disk, optical disks, solid-state memory, etc.), network adapters, etc. As shown, the hardware 107 also includes NICs 113-115 for connecting a computing device to a network.

The virtualization software that includes the kernel 105 and user space 110 is a software abstraction layer that operates on top of the hardware 107 and below any operating system in some embodiments. In some embodiments, the kernel 105 performs virtualization functionalities (e.g., to virtualize the hardware 107 for several virtual machines operating on the host machine). The kernel 105 handles various management tasks, such as memory management, processor scheduling, or any other operations for controlling the execution of the VMs 135-138 operating on the host machine.

As shown, the kernel 105 includes device drivers 125-130 for the NICs 113-115, respectively. The device drivers 125-130 allow an operating system to interact with the hardware of the host 100. The VMs 135-138 are independent virtual machines operating on the host 100, and may run any number of different operating systems (e.g., Linux, Solaris, FreeBSD, or any other type of UNIX based operating system, Windows-based operating systems, etc.). While this figure shows an example in which the MFE operates within the virtualization software of the host and the VMs 135-138 operate on top of that virtualization software, it should be understood that the caching hierarchy is equally possible in embodiments in which the MFE is not part of any virtualization software (e.g., in non-virtualized environments). In some such embodiments, no virtualization software is present on the host machine, and thus VMs are not present (instead, packets may simply be forwarded between NICs).

The user space 110 of the virtualization software includes the MFE daemon 165, the MFE database daemon 167, and the statistics reporting daemon 190. The MFE daemon 165 is an application that runs in the background of the user space 110. The MFE daemon 165 of some embodiments receives configuration data from the network controller 180 (which may be a chassis controller operating on the host, or a network controller operating on a separate physical machine to manage several host machines) and the MFE database daemon 167. For instance, from the controller, the MFE daemon 165 of some embodiments receives generated flow entries that specify packet processing operations to apply to packets when the packets match a set of conditions. The MFE daemon 165 stores the received flow entries in the flow tables 171-175. In some embodiments, the flow tables are organized in stages (e.g., stages of packet processing), with one or more stages for each of several logical forwarding elements. For instance, a logical forwarding element might have an ingress mapping stage, an ingress access control list (ACL) stage, a logical forwarding stage, an egress ACL stage, etc. For an MFE implementing multiple logical networks, each of the logical networks has several stages of flow tables in some embodiments.

To solve the problem of flows and their corresponding statistics getting churned due to configuration and feature changes, the controller 180 in some embodiments creates a separate flow table 171 dedicated for logical entity packet statistics. For each logical entity for which statistics is collected, the controller creates a flow for each counter type (e.g., a logical entity will have 1 flow for ingress packet count, 1 flow for ingress drop, etc.).

The flows in the statistics collection flow table 171 are only installed once by the controller and are only removed if the logical entity is deleted. Each of these flows' matching criteria only matches on two dedicated registers in some embodiments. As described below, some embodiments use a set of registers to store intermediate data such as packet header values, metadata such as ingress port number, etc. The first of the two dedicated registers matches on the statistics counter type and the second register matches on the identifier of the logical entity. The flows are agnostic to specific configuration of the logical entity, so any changes to the logical entity will not cause changes to the flows in the statistics collection flow table. The flows in this table do not have any action, except for a note action that specifies some metadata about the flow (e.g., UUID, counter type, etc.). The datpath manager 120 maintains statistics for logical entities in the form of counters that are included in the flow entries of the statistics collection flow table. The flow metadata is used by the statistics reporting daemon 190 to find and extract the statistics of interest. Further details of the statistics collections of some embodiments are described below.

In some embodiments, the MFE daemon 165 communicates with the network controller 180 using the OpenFlow Protocol, while the MFE database daemon 167 communicates with the network controller 165 through a database communication protocol (e.g., OVSDB protocol). The database protocol of some embodiments is a JavaScript Object Notation (JSON) remote procedure call (RPC) based protocol.

The MFE database daemon 167 is also an application that runs in the background of the user space 110 in some embodiments. The MFE database daemon 167 of some embodiments communicates with the network controller 180 in order to configure certain aspects of the MFE (e.g., of the MFE daemon 165 and/or the datapath manager 120) other than the installation of flow entries. For instance, the MFE database daemon 167 receives management information from the network controller 180 for configuring bridges, ingress ports, egress ports, QoS configurations for ports, etc., and stores the information in a set of databases that help define the configuration of the MFE.

As illustrated in FIG. 1, the kernel 105 includes a datapath manager 120. Datapath manager processes and forwards network data (e.g., packets) between VMs running on the host 100 and network hosts external to the host (e.g., network data received through the NICs 113-115). In some embodiments, the VMs 135-138 running on the host 100 couple to the datapath manager through a bridge (or datapath) 150.

In some embodiments, the bridge 150 manages a set of rules (e.g., flow entries) that specify operations for processing and forwarding packets. The bridge 150 communicates with the MFE daemon 165 in order to process and forward packets that the bridge 150 receives. In the example of FIG. 1, the bridge 150 includes a packet processor 155, a classifier 157, and an action processor 159. The packet processor 155 receives a packet and parses the packet to strip header values. The packet processor 155 can perform a number of different operations. For instance, in some embodiments, the packet processor 155 is a network stack that is associated with various network layers to differently process different types of data that it receives. Irrespective of all the different operations that it can perform, the packet processor 155 passes packet header values to the classifier 157. In some embodiments, the packet processor stores these header values in one or more registers that are stored for a packet. In some embodiments, the packet processor 155 defines an object for the packet that includes the registers. The packet object is then used to represent the packet in the MFE.

The classifier 157 accesses one or more datapath caches 163 (also referred to as a flow cache) to find matching flow entries for different packets. For instance, in some embodiments, the classifier includes a flow aggregate cache that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries (other than the flow entries of the statistics collection flow table 171) in the datapath cache 163 specifies an action for the action processor 159 to perform on packets that match the flow entries. These datapath cache flow entries are installed by the classifier 157, in some embodiments, based on processing of a packet through the set of flow tables by the MFE daemon 165.

If the classifier 157 finds a matching flow entry in the cache, the action processor 159 receives the packet and performs a set of actions specified by the matching flow entry. When a packet requires processing by the MFE daemon 165, the action processor 159 of some embodiments receives, from the MFE daemon 165, the packet and a set of instructions for actions to perform on the packet.

The MFE daemon 165 of some embodiments includes a datapath flow generator 170. The datapath flow generator 170 is a component of the MFE that makes forwarding and other packet processing decisions. For any packet that is not matched in the datapath cache 163 (e.g., because the packet is the first in a new transport-layer connection), the datapath flow generator 170 performs the one or more flow table lookups required to process the packet, and then generates new flow entries to install in the cache 163. In some embodiments, the datapath flow generator includes or works in conjunction with a separate classifier (not shown) in order to find one or more matching flow entries in the flow tables. Unlike the classifier 157, the MFE daemon 165 may perform one or more resubmits (i.e., be resubmitted back to the classifier with packet data modified based on actions performed by previous matched flow entries).

It should be understood that the architecture shown in FIG. 1 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

II. Collecting Statistics for all Logical Entities at a Single Flow Table

Each flow table has one or more flow entries. In prior art flow-based forwarding elements, each flow entry collects statistics for the corresponding flow. A flow exporter daemon retrieves and sends the flow statistics to a statistics aggregator. The statistics aggregator aggregates the statistics for each logical entity from different flows based on a note action (or tag) associated with each flow entry.

Figure 2:
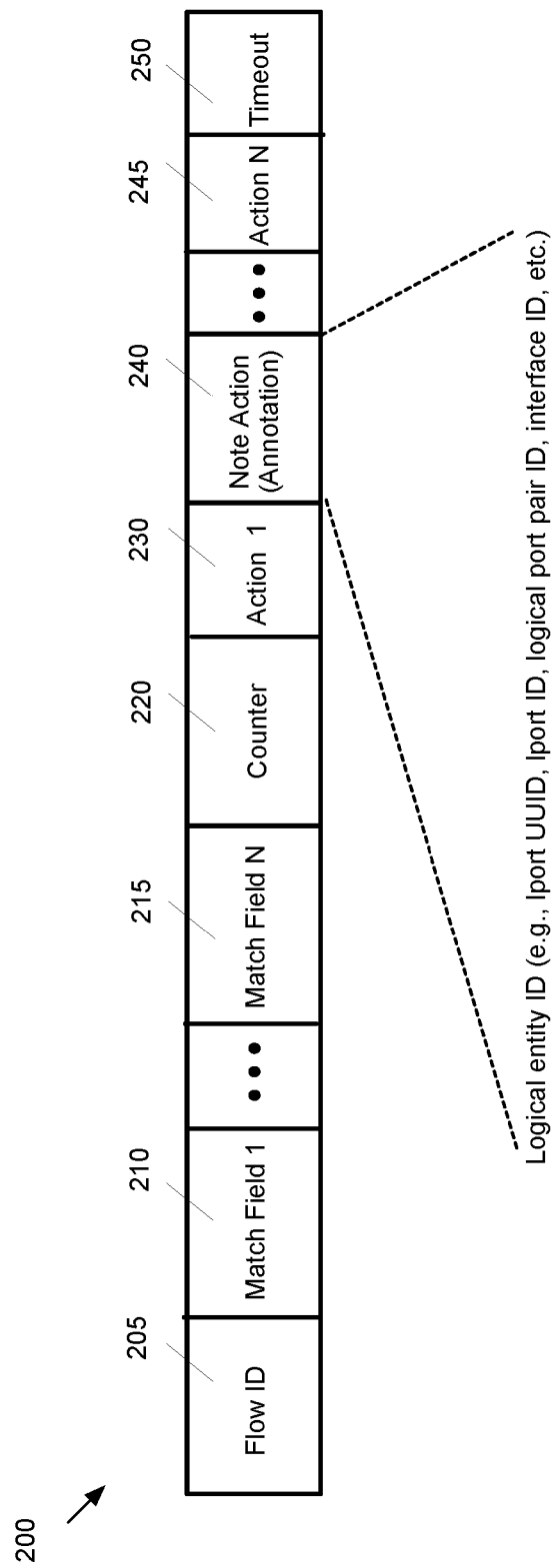
FIG. 2 illustrates an example of a flow entry for a flow table according to prior art.

FIG. 2 illustrates an example of a flow entry 200 of a flow table according to prior art. The flow entry 200 includes a flow identification 205, several match fields 210-215, a counter field 220, several action fields 230-245, and a timeout field 250.

The flow identifier 205 is used to identify the flow. The match fields 210-215 are used to match against packet data. The counter is used to calculate statistics and is updated as the packets are matched to the match fields.

The action fields 230-245 (other than note action field 240) are used to perform packet processing such as forwarding, modifying, or dropping packets once a packet matches one of the flow's match fields 210-215. The note action field 240 is used to include one or more metadata (also herein referred as a tag). Examples of such tags include an identifier of a logical entity (e.g., a logical port UUID), a counter type (e.g., 0 for ingress, 1 for egress), type information (e.g., logical port stats or otherwise), a version number, etc. The note action is used to tag a flow with one or more tags in order to facilitate the collection of statistics.

In prior art, therefore, the statistics for each flow is collected at the flow entry during the processing of the flow. The statistics is kept in the counter 220. A flow statistics exporter in the MFE sends the flow statistics to a statistics aggregator. The statistics aggregator aggregates each logical entity's statistics using the logical entity's tag in the collected statistics.

The flows installed by the controller are dependent on the features and configurations applied to a logical entity (e.g., media access control (MAC) address, distributed firewall, security, etc.). For instance, when the MAC address of a logical port changes, then the controller installs new flows (and deletes the corresponding old flows) to reflect the new MAC address. The problem with this method is that flow statistics share the same lifetime of a flow. If a flow is deleted, then the corresponding statistics gets deleted too. This results in possible inaccurate or incomplete packet statistics reported to the management plane. As another example, when ARP snooping is enabled, the controller installs or removes the appropriate flow.

To solve the problem of flows and their corresponding statistics getting churned due to configuration and feature changes, the controller 180 (shown in FIG. 1) in some embodiments creates a separate flow table (e.g., the statistics collection flow table 171 in FIG. 1) that is dedicated for logical entity packet statistics. For each logical entity for which statistics is collected, the controller creates a flow for each counter type (e.g., a logical entity will have 1 flow for ingress packet count, 1 flow for ingress drop, etc.).

Figure 3:
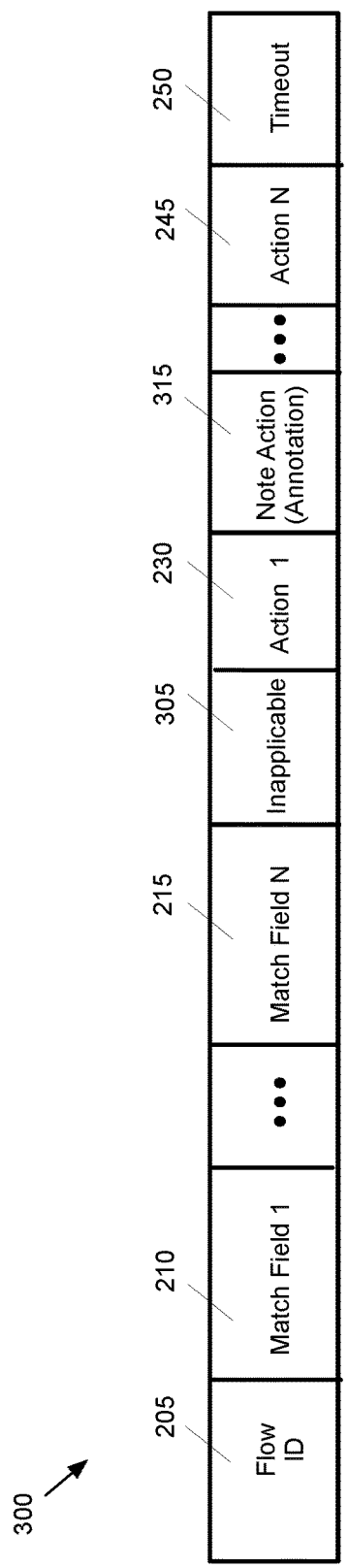
FIG. 3 conceptually illustrates an example of a flow table entry for a flow table that is used to process packets in some embodiments.

FIG. 3 conceptually illustrates an example of a flow table entry 300 in some embodiments that is used to process packets for one of flow tables 175 (i.e., any flow table other than the statistics collection flow table 171). Fields 205-250 are similar to their counterparts in FIG. 2. However, in FIG. 3, field 305 is inapplicable while in FIG. 2, this field is used as a counter to keep statistics for each individual flow. Unlike the prior art, the flow entries for packet processing flow tables 175 are not used to collect statistics and do not use any fields as statistics counter. In addition, the note action field 315 is not used to tag the flow with the metadata required for tagging flow statistics.

Figure 4:
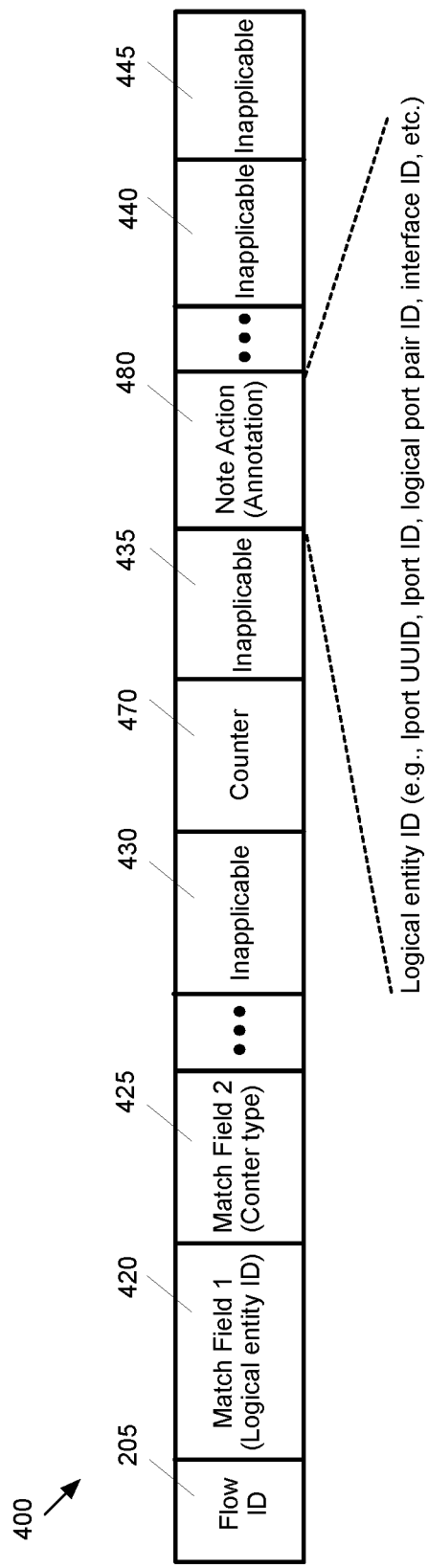
FIG. 4 conceptually illustrates examples of flow table entries for a statistics collection flow table in some embodiments.

FIG. 4 conceptually illustrates examples of flow table entries for a statistics collection flow table (such as flow table 171 in FIG. 1) in some embodiments. As shown, the flow table 400 includes a flow identifier 205, two match fields 420-425, one counter 470, and a note action field 480. All other fields including action fields are inapplicable. In particular, the flow entry 400 does not have any match fields other than the two match fields 420 and 425. In addition, the flow entry 400 does not have any actions other than the note action 480, which only includes metadata to tag the statistics and does not perform any actions.

The match field 420 includes the identifier of the logical entity for which the flow entry 400 is used to collect statistics. The match field 425 includes the statistics counter type (e.g., ingress drops due to distributed firewall, egress drops due to spoof guard, egress drops due to a particular security feature, total ingress statistics (e.g., total number of received packets and bytes), total egress statistics (e.g., total number of transmitted packets and bytes), etc.). The flow entries in the statistics collection flow table 171 are only installed once by the controller and are only removed if the logical entity is deleted. As shown, the timeout field 445 in the flow entry 400 is inapplicable. In other words, the flow entry does not expire and is only deleted when the corresponding logical entity is deleted.

As an example, match field 420 may include logical identifier of ingress port 5, while match field 425 may include the counter type for total ingress statistics. In this example, statistics counter 470 keeps track of total ingress statistics (e.g., total number of received packets and bytes).

Figure 5:
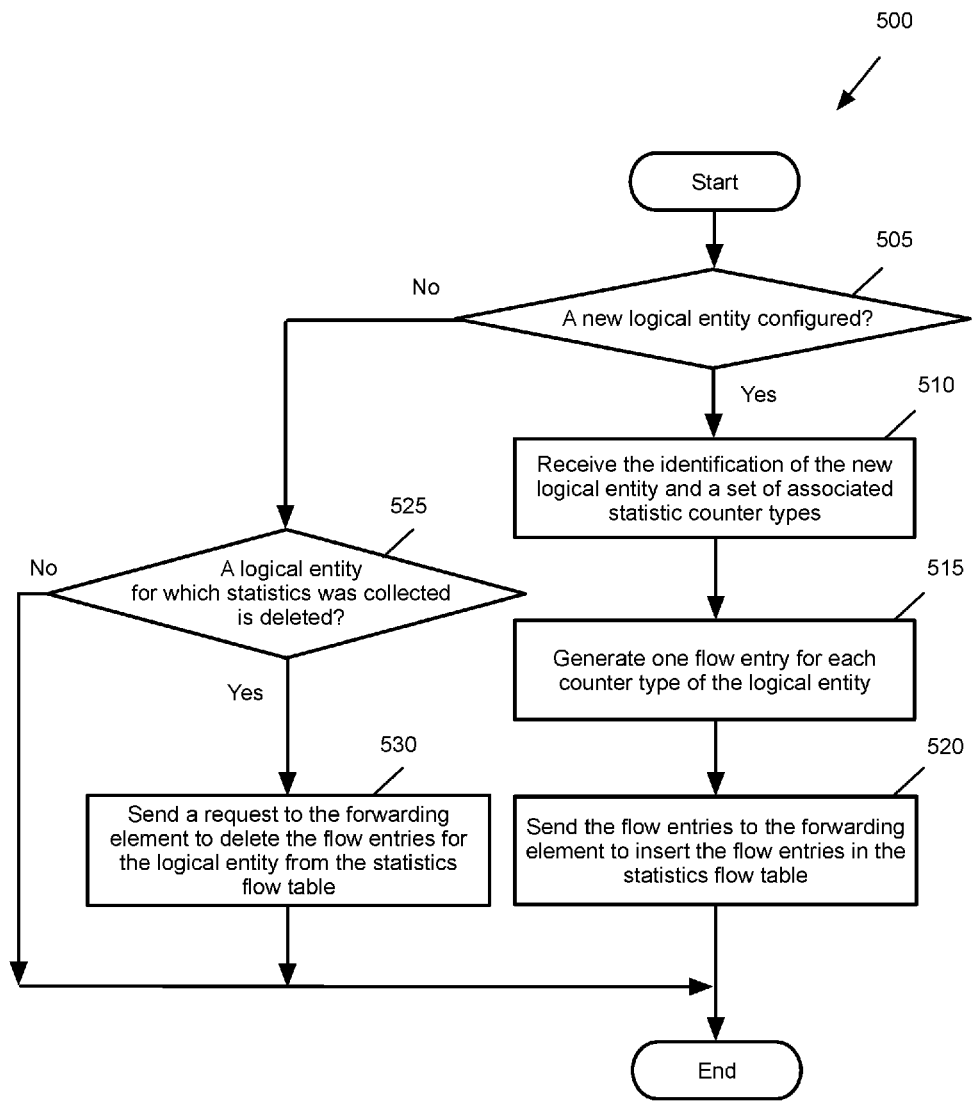
FIG. 5 conceptually illustrates a process for generating or deleting flow entries of the statistics collection flow table in some embodiments.

The controller 180 in FIG. 1 generates flow entries and sends the flow entries to the MFE daemon 165. The controller also instructs the MFE daemon to delete flow entries for logical entries that are deleted. FIG. 5 conceptually illustrates a process 500 for generating or deleting flow entries in the statistics collection flow table in some embodiments. The process in some embodiments is performed by a controller such as the controller 180 in FIG. 1. As shown, the process determines (at 505) whether a new logical entity is configured. If not, the process proceeds to 525, which is described below.

Otherwise, the process receives (at 510) the identification of the new logical entry and a set of associated statistics counter types for the logical entry. For instance, when a new ingress port is configured on a forwarding element, the process receives the identification of the ingress port as well as one or more counter types such as ingress drops due to distributed firewall, egress drops due to spoof guard, egress drops due to a particular security feature, total ingress statistics, etc.

The process then generates (at 515) one flow entry for each counter type of the logical entry. In other words, the process generates one flow entry for each pair of logical entity and statistics counter type. For instance, the process generates one flow entry such as flow entry 400 for each pair of logical entity and statistics counter type.

The process then sends (at 520) the generated flow entries to the forwarding element to insert the flow entries in the statistics flow table. For instance, the process sends the flow entries from the controller 180 to MFE daemon 165 and datapath flow generator 170 in FIG. 1. The process then ends.

The process determines (at 525) whether a logical entity for which statistics were collected is deleted. If not, the process ends. Otherwise, the process sends (at 530) a request to the forwarding element to delete the flow entries for the logical entity from the statistics flow table. The process then ends.

Figure 6:
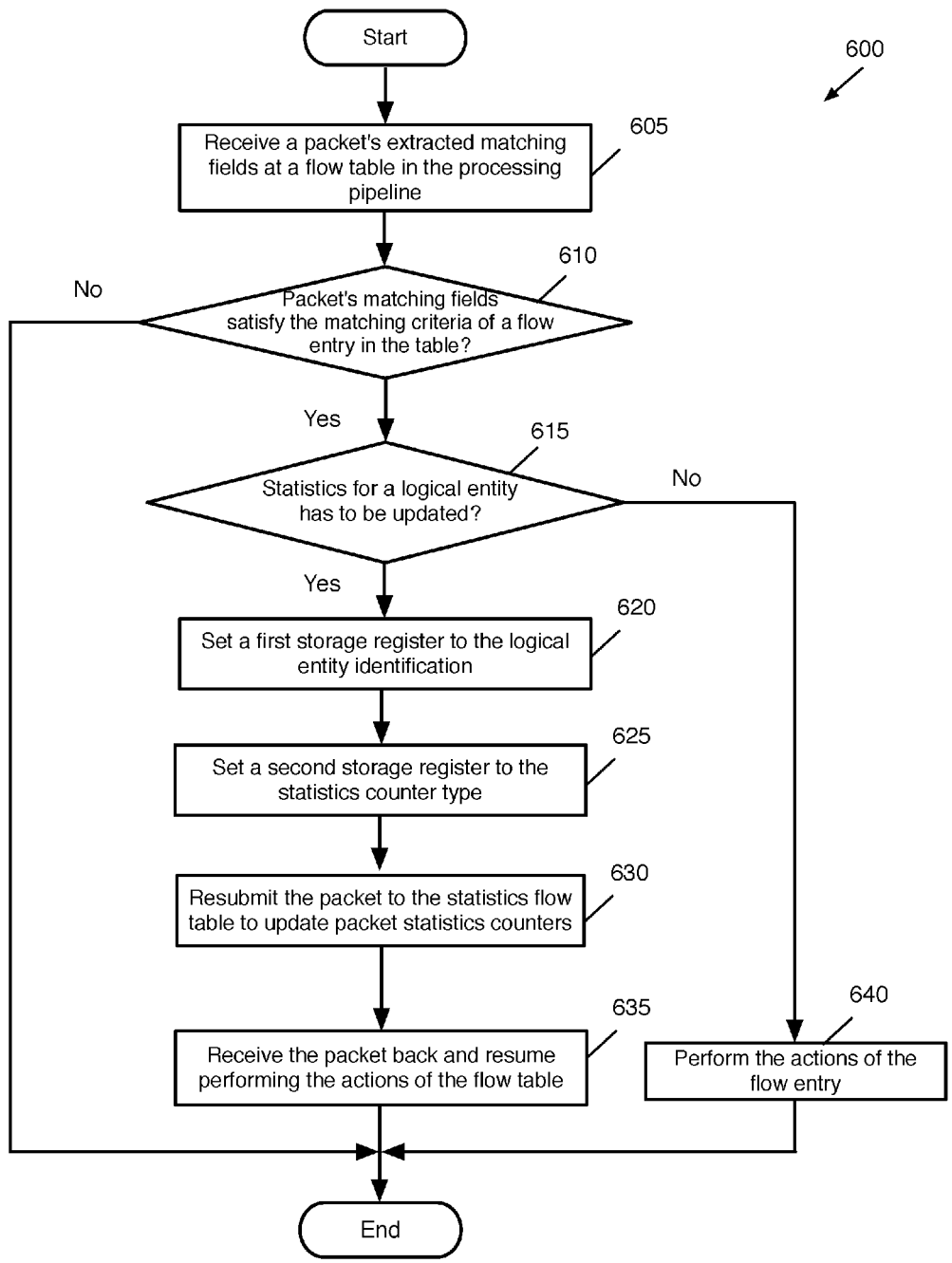
FIG. 6 conceptually illustrates a process performed by a match-action flow entry to resubmit a packet to the statistics collection flow table to update statistics in some embodiments.

FIG. 6 conceptually illustrates a process 600 performed by a match-action flow entry to resubmit a packet to the statistics collection flow table to update statistics in some embodiments. The process in some embodiments is performed by classifier 157 when a flow table 175 that is cached in datapath cache 163 is processed in the processing pipeline of the MFE.

As shown, the process receives (at 605) a packet's extracted matching fields at a flow table in the processing pipeline of a forwarding element. For instance, the process receives extracted match fields of a packet from packet processor 155 at the classifier 157 shown in FIG. 1.

The process then determines (at 610) whether the packet's matching fields satisfy the matching criteria of a flow entry in the flow table. If not, the process ends. Otherwise, the process determines (at 615) whether the statistics for a logical entity has to be updated. For instance, if a packet is received at an ingress port, the process determines whether the packet count and the byte count for the ingress port has to be updated. As another example, if the packet has to be dropped due to a security reason, the process determines whether the packet drop count for a logical entity such as an ingress port has to be updated.

Figure 7:
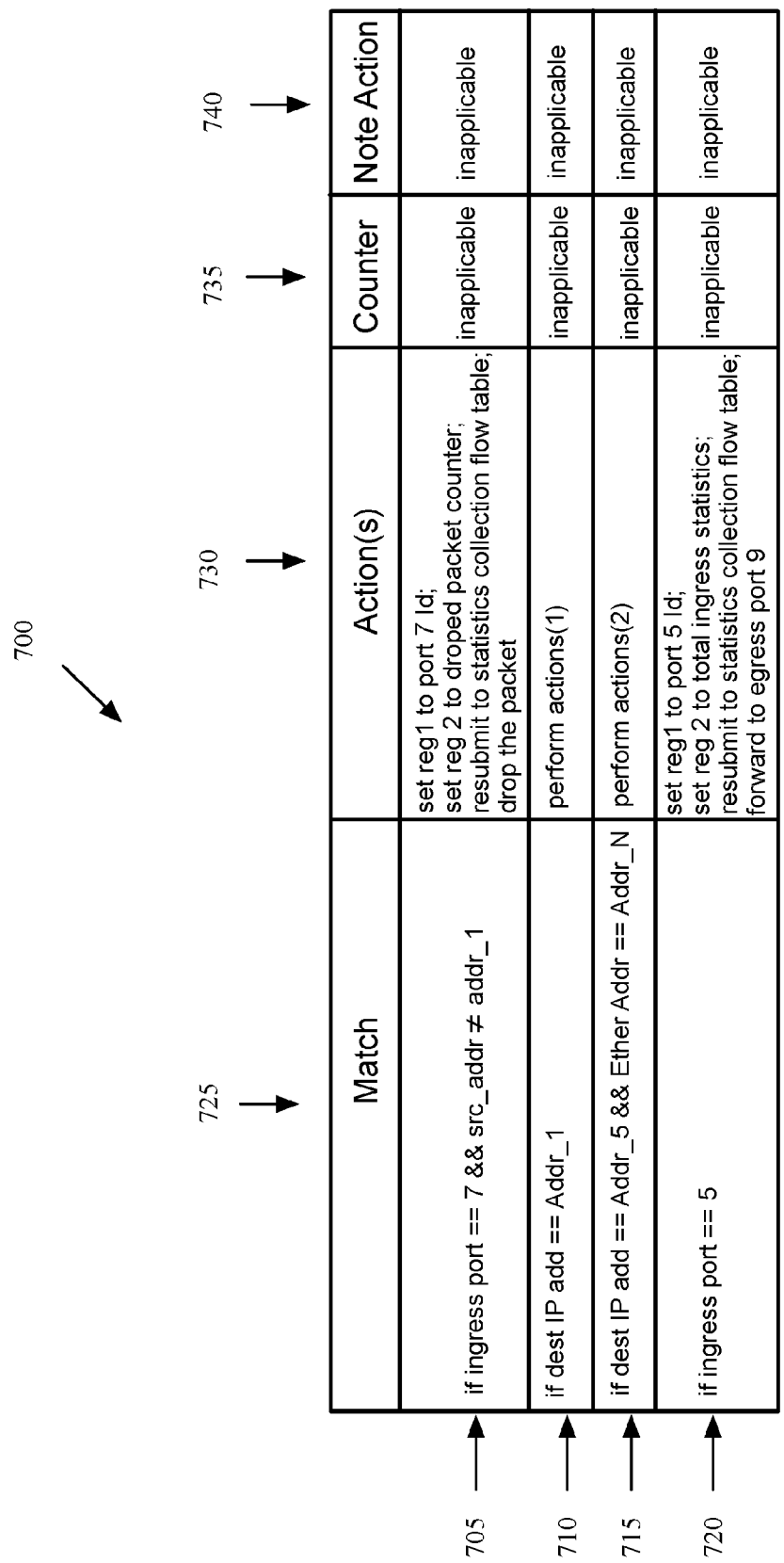
FIG. 7 conceptually illustrates an example of a flow table processed by the process of FIG. 6 in some embodiments.

FIG. 7 conceptually illustrates an example of a flow table that includes flow entries processed by process 600 in some embodiments. Each row 705-720 of flow table 700 is one flow entry. Each flow entry has a set of match fields 725. The match fields are similar to match fields 210-215 in FIG. 3 and their contents are conceptually shown as a set of logical conditions (or expressions). Each flow entry also has a set of action fields 730. The action fields 730 are similar to action fields 230 and 245 in FIG. 3 and their contents are conceptually shown as a set of operations. Each flow entry includes a counter 735. The Each flow entry also includes a note action field 740. The counter 735 in prior art was used to collect statistics for individual flows. A statistics exporter in prior art would send the statistics for individual flows to a statistics aggregator. The statistics aggregator would use the note actions for each flow to aggregate statistics for logical entities. However, as shown in FIG. 7, the counter 735 and the note action 740 fields are inapplicable. Instead, as described further below, the statistics for logical entities are collected by a statistics collection flow table.

In the example of FIG. 7, the match fields for flow entry 705 are ingress port and source address. The matching criteria are satisfied when the ingress port is 7 and the source address is not addr_1. The corresponding action for this flow entry is to drop the packet. However, in order to update packet drop statistics for ingress port 7, the corresponding action also includes instructions to set register 1 (reg 1) to the identification of ingress port 7 and to set register 2 (reg 2) to indicate the counter type as dropped packet counter. The action also includes a resubmit operation that resubmits the packet to statistics collection flow table (e.g., to resubmit the packet back to the classifier 157 to be submitted to the statistics collection flow table).

When the packet is resubmitted to the statistics collection flow table, the processing of the statistics collection flow table (as described further below) updates the statistics and resubmits the packet (e.g., through the classifier 157) to the original flow 705 to continue the flow's operations (in this example to drop the packet).

The only match field for flow entry 720 is ingress port. The matching criteria is satisfied when the ingress port number is 5. The corresponding action is forwarding the packet to egress port 9. However, in order to update ingress packet statistics for ingress port 5, the corresponding action also includes instructions to set register 1 to the identification of ingress port 5 and to set register 2 to indicate the counter type as total ingress statistics. The action also includes a resubmit operation that resubmits the packet to statistics collection flow table. When the packet is resubmitted to the statistics collection flow table, the statistics collection flow table (as described further below) updates the statistics and resubmits the packet to the original flow 720 to continue the flow's operations (in this example to forward the packet to egress port 9).

In the example of FIG. 7, flow entries 710 and 715 do not involve operations that require updating a logical entity's statistics. As shown, the corresponding actions do not include resubmitting the packet to the statistics collection flow table.

Referring back to FIG. 6, when there is no need to update the statistics for a logical entity, the process performs (at 640) the actions of the flow entry. The process then ends. Otherwise, the process sets (at 620) a first storage register to the logical entity identification. The process then sets (at 625) a second storage register to the statistics counter type. The registers in some embodiments are temporary storage used to store matching fields extracted from a packet header, metadata such as ingress port where the packet is received, as well as temporary information used during the processing of the packet. In some embodiments, two of theses registers are used for storing matching information for statistics collection. One register stores the logical entity for which the statistics is being updated and another register stores the type of statistics counter (e.g., total ingress statistics, total egress statistics, egress drops due to a security feature, etc.) that is updated.

The process then resubmits (at 630) the packet to the statistics flow table to update the packet statistics counters. For instance, the process resubmits the packet to the classifier 157 in the bridge (or datapath) 150 in FIG. 1 identifying the statistics collection flow table as the next table to process the packet. After the processing by the statistics flow collection table, the process receives back (at 635) the packet and resumes performing the activities of the flow table. The process then ends.

Figure 8:
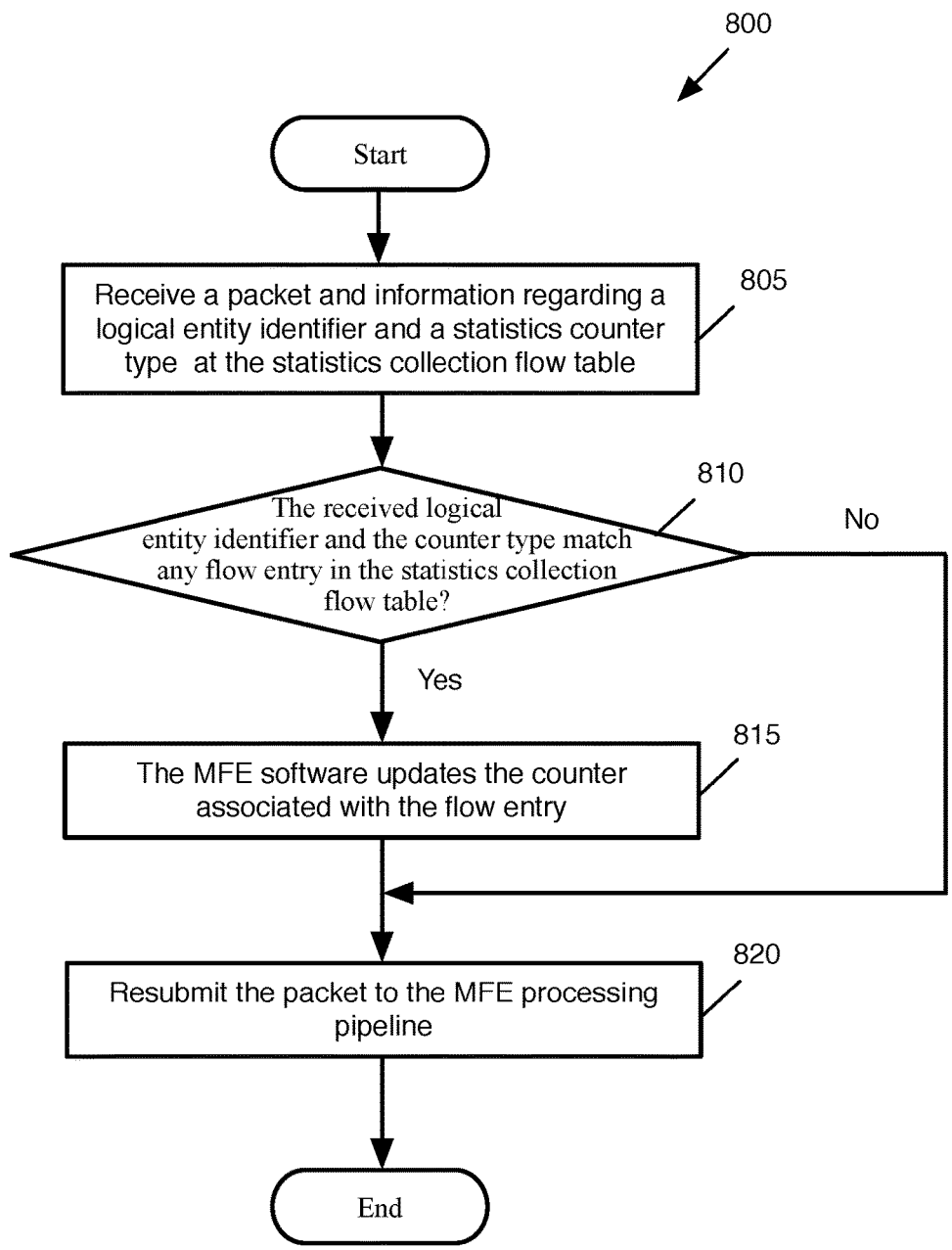
FIG. 8 conceptually illustrates a process for updating statistics in some embodiments.

FIG. 8 conceptually illustrates a process 800 for updating statistics in some embodiments. The process in some embodiments is performed by the statistics collection flow table to update logical entities statistics. As shown, the process receives (at 805) a packet and information regarding a logical entity identifier and a statistics counter type at the statistics collection flow table. For instance, the process receives the packet, the logical entity identifier, and the counter type when a flow table resubmits a packet to the statistics collection flow table as described above by reference to FIGS. 6 and 7.

The process then determines (at 810) whether the received logical entity identifier and the counter type match any flow entry fields in the statistics collection flow table. For instance, the process determines whether the received logical entity identifier and the counter type match fields 420 and 425 shown in FIG. 4. If there are no matches, the process proceeds to 820, which is described below.

If the matching criteria are satisfied by a flow entry, the MFE software automatically updates (at 815) the counter associated with that flow entry. Updating of the counter in some embodiments does not require any action fields. A flow-based forwarding element (e.g., an OVS based MFE) automatically updates the counter associated with a match-action flow entry when a packet satisfies the matching criteria of the flow entry.

Figure 9:
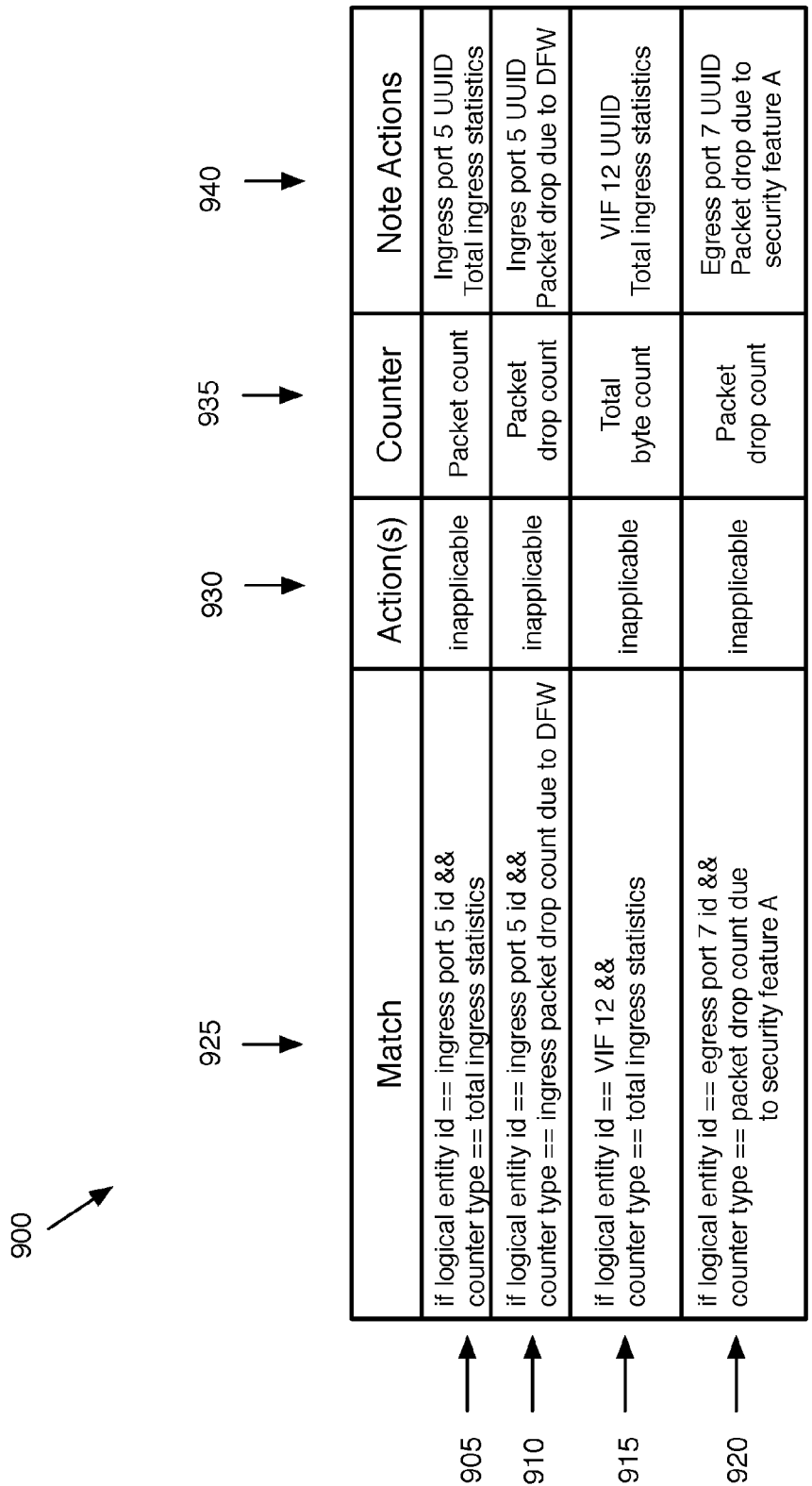
FIG. 9 conceptually illustrates an example of a statistics collection flow table processed by the process of FIG. 8 in some embodiments.

FIG. 9 conceptually illustrates an example of a statistics collection flow table processed by process 800 in some embodiments. Each row 905-920 of flow table 900 is one flow entry. Each flow entry has a set of match fields 925. The match fields correspond to the two match fields 420 and 425 in FIG. 4 and their contents are conceptually shown as set of logical conditions (or expressions) for logical entity identification and statistics counter type.

As shown, the set of action fields 930 for all flow entries in the statistics collection flow table 900 are inapplicable. Each flow entry has one corresponding counter 935. Each flow entry also includes a note action field 940, which is used to tag the statistics collected for the associated logical entity statistics counter. As described below by reference to FIG. 10, a statistics reporting daemon uses the note actions in statistics collection flow table 900 to collect and report the statistics to the management plane.

In the example of FIG. 9, the matching criteria for flow entry 905 are satisfied when the ingress port is 5 and the counter type is total ingress statistics. Flow entry 910 is also used to collect statistics for the same logical entity, i.e., ingress port 5. However, the counter type for flow entry 910 is ingress packet drop count due to distributed firewall. Specifically, the statistics collection flow table 900 has multiple flow entries for each logical entity that requires more then one type of statistics. The note action fields include metadata to identify the logical entity and the associated statistics.

The matching criteria for flow entry 915 are satisfied when the logical entity is virtual interface (VIF) number 12 and the counter type is the total ingress statistics (e.g., total number of packets and total number of bytes) received at the VIF. The note actions identify the VIF as VIF 12 and the counter type as total ingress statistics. The matching criteria for flow entry 920 are satisfied when the logical entity is egress port 7 and the counter type is the packet drop count due to a security feature (e.g., security feature A). The note actions 940 identify the logical entity as egress port 7 and the counter type as packet drop count due to security feature A.

Referring back to FIG. 8, the process then resubmits (at 820) the packet back to the MFE's processing pipeline. For instance, the process returns the packet the processing pipeline such that the flow entry that had submitted the packet to the statistics collection flow table can resume processing of the packet as described by reference to operation 635 in FIG. 6. The process then ends.

Figure 10:
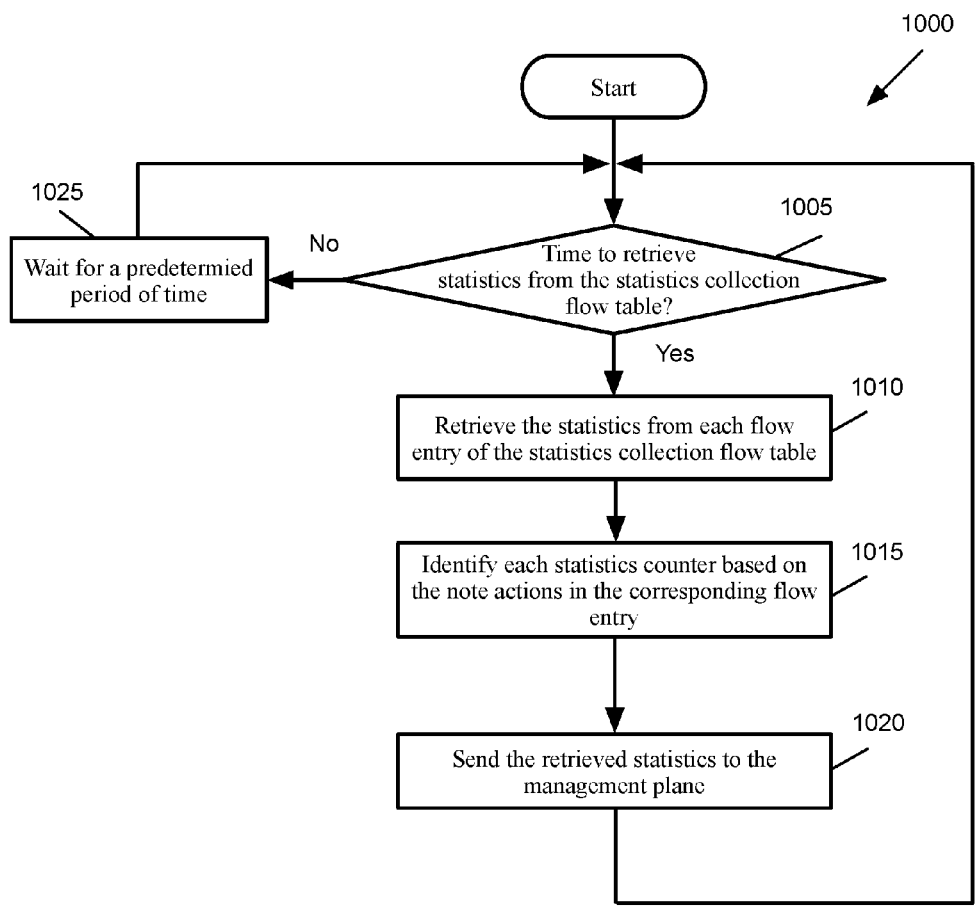
FIG. 10 conceptually illustrates a process for periodic reporting of statistics collected by the statistics collection flow table to the management plane in some embodiments.

FIG. 10 conceptually illustrates a process 1000 for periodic reporting of statistics collected by the statistics collection flow table to the management plane in some embodiments. The process in some embodiments is performed by a daemon such as the statistics reporting daemon 190 in FIG. 1. The process is used to periodically collect statistics and report them to the MFE's management plane (e.g., in order to display the statistics at an operator terminal).

As shown, the process determines (at 1005) whether it is time to retrieve statistics from the statistics collection flow table. If not, the process waits (at 1025) for a predetermined time and proceeds back to 1005, which is described above. Otherwise the process retrieves (at 1010) the statistics from each flow entry of the statistics collection flow table. For instance, the process retrieves the counter value 470 in FIG. 4 or 935 in FIG. 9.

The process then identifies (at 1015) each statistics based on the note actions in the corresponding flow entry. For instance, the process identifies the statistics retrieved from flow entry 920 in FIG. 9 as packet drop count due to security feature A for egress port 7. The process then sends (at 1020) the retrieved statistics to the management plane. The process then proceeds to 1005, which was described above.

Figure 11:
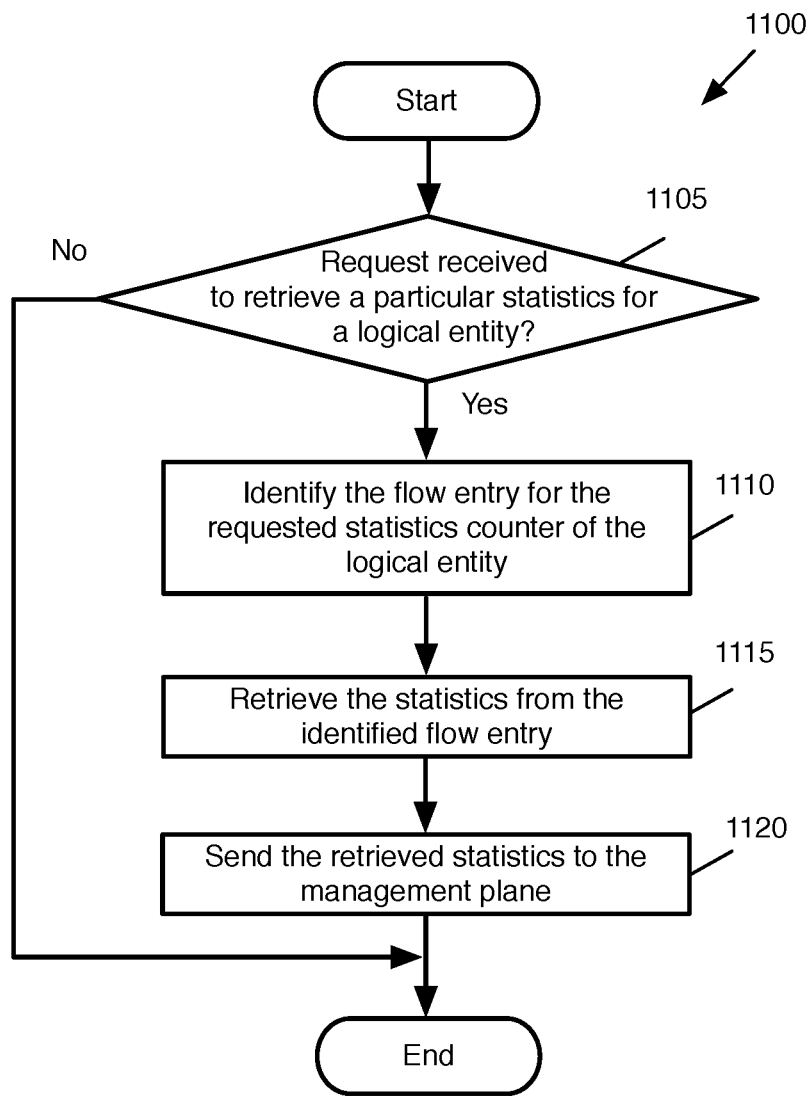
FIG. 11 conceptually illustrates a process for on demand reporting of statistics collected by the statistics collection flow table to the management plane in some embodiments.

FIG. 11 conceptually illustrates a process 1100 for on demand reporting of statistics collected by the statistics collection flow table to the management plane in some embodiments. The process in some embodiments is performed by a daemon such as the statistics reporting daemon 190 in FIG. 1. The process is used to collect statistics on demand and report them to the management plane (e.g., in order to display the statistics at an operator terminal).

As shown, the process determines (at 1105) whether a request is received to retrieve a particular statistics for a logical entity. For instance, the process determines whether a request is received to retrieve statistics for packets dropped due to the distributed firewall for ingress port 5. If not, the process ends. Otherwise the process identifies (at 1110) the flow entry that includes the requested statistics for the logical entity. For instance, if the request is for the number of dropped packets due to the distributed firewall for ingress port 5, the process identifies flow entry 910 in FIG. 9 as the flow entry that includes the requested statistic.

The process then retrieves (at 1115) the statistics from identified flow entry. For instance, the process retrieves the counter value of flow entry 910 in FIG. 9. The process then sends (at 1120) the retrieved statistics to the management plane. The process then ends.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
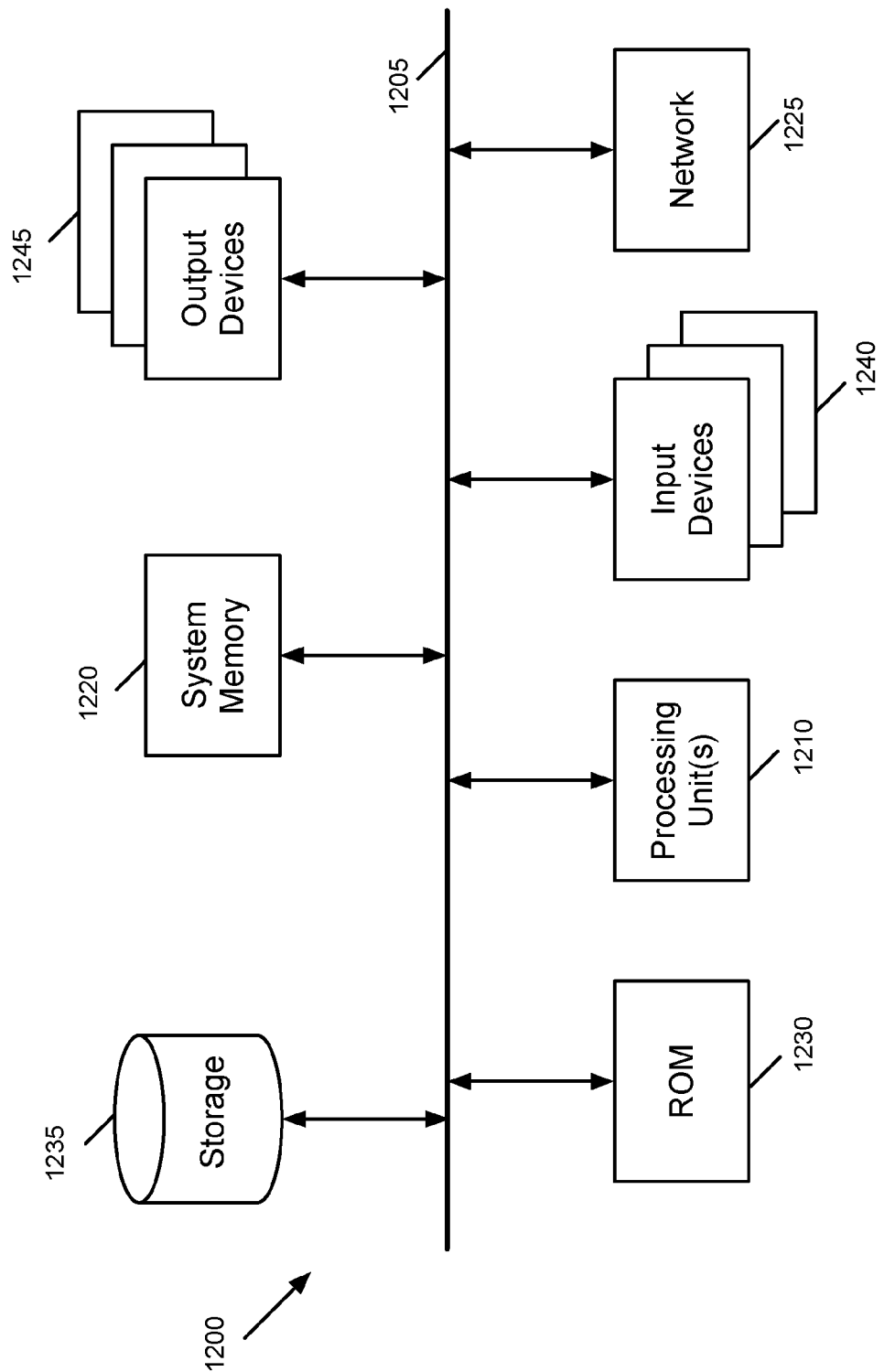
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1220, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1220, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1220 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 5-6, 8, and 10-11) conceptually illustrate processes.

The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of collecting statistics for a set of logical entities associated with a flow-based managed forwarding element (MFE) executing on a computer to implement the set of the logical entities, the method comprising:
   creating a flow-processing first flow table for processing packets received by the MFE of the computer and a statistics-collecting second flow table for collecting statistics for the set of logical entities associated with the flow-based MFE;
   for each pair of logical entity and collected statistics type, adding a flow entry to the statistics-collecting second flow table, each added flow entry comprising a set of matching criteria comprising (i) an identification of the logical entity corresponding to the flow entry and (ii) a type of the statistics collected by the flow entry;
   when a first type of statistics for a particular logical entity is to be updated during the processing of a received packet by the flow-processing first flow table, submitting the received packet from the flow-processing first flow table to the statistics-collecting second flow table; and
   at the statistics-collecting second flow table, updating the first type of statistics for the particular logical entity by matching the identification of the particular logical entity and the first type of statistics with the matching criteria of a flow entry in the statistics-collecting second flow table.

2. The method of claim 1 further comprising adding a set of note actions to each flow entry in the statistics-collecting second flow table to identify the statistics collected by the flow entry, the set of note actions comprising the identification of the logical entity corresponding to the flow entry and the type of statistics collected by the flow entry for the corresponding logical entity.

3. The method of claim 2 further comprising:
   retrieving each statistics type for each logical entity from a corresponding flow entry of the statistics-collecting second flow table based on the note actions of the corresponding flow entry; and
   sending the retrieved statistics to a management plane of the flow-based managed forwarding element.

4. The method of claim 1, wherein submitting the received packet by said flow-processing first flow table to the statistics-collecting second flow table comprises sending the received packet to a processing pipeline of the flow-based managed forwarding element with a request to submit the received packet to the statistics-collecting second flow table.

5. The method of claim 1 further comprising submitting the received packet back from the statistics-collecting second flow table to said flow-processing first flow table processing the received packet to resume the processing of the received packet.

6. The method of claim 1 further comprising:
   prior to submitting the received packet by said flow-processing first flow table to the statistics-collecting second flow table, (i) storing an identification of the particular logical entity in a first temporary register storage, and (ii) storing the type of statistics in a second temporary register,
   wherein updating the statistics for the particular logical entity by the statistics-collecting second flow table comprises (i) using the first and second temporary storage registers to match the matching criteria of a flow entry in the statistics-collecting second flow table, and (ii) updating the statistics collected by the matched flow entry.

7. The method of claim 1, wherein the statistics type is one of a number of received packets, a number of packets dropped, a numbered of packets dropped for each particular security reason, and a number of bytes received.

8. A non-transitory computer readable medium storing a program for collecting statistics for a set of logical entities associated with a flow-based managed forwarding element executing on one computer, the program executable by a processing unit, the program comprising sets of instructions for:
   creating a flow-processing first flow table for processing received packets and a statistics-collecting second flow table for collecting statistics for a set of logical entities on one computer;
   adding, for each pair of logical entity and collected statistics type, a flow entry to the statistics-collecting second flow table, each added flow entry comprising a set of matching criteria comprising (i) an identification of the logical entity corresponding to the flow entry and (ii) a type of the statistics collected by the flow entry;

submitting, when a first type of statistics for a particular logical entity is to be updated during the processing of a received packet by the flow-processing first flow table, the received packet from the flow-processing first flow table to the statistics-collecting second flow table; and updating, at the statistics-collecting second flow table, the first type of statistics for the particular logical entity by matching the identification of the particular logical entity and the first type of statistics with the matching criteria of a flow entry in the statistics-collecting second flow table.

9. The non-transitory computer readable medium of claim 8, the program further comprising a set of instructions for adding a set of note actions to each flow entry in the statistics-collecting second flow table to identify the statistics collected by the flow entry, the set of note actions comprising the identification of the logical entity corresponding to the flow entry and the type of statistics collected by the flow entry for the corresponding logical entry.

10. The non-transitory computer readable medium of claim 9, the program further comprising sets of instructions for:

retrieving each statistics type for each logical entity from a corresponding flow entry of the statistics-collecting second flow table based on the note actions of the corresponding flow entry; and sending the retrieved statistics to a management plane of the flow-based managed forwarding element.

11. The non-transitory computer readable medium of claim 8, wherein the set of instructions for submitting the received packet by said flow-processing first flow table to the statistics-collecting second flow table comprises a set of instructions for sending the received packet to a processing pipeline of the flow-based managed forwarding element with a request to submit the received packet to the statistics-collecting second flow table.

12. The non-transitory computer readable medium of claim 8, the program further comprising a set of instructions for submitting the received packet back from the statistics-collecting second flow table to said flow-processing first flow table processing the received packet to resume the processing of the received packet.

13. The non-transitory computer readable medium of claim 8, the program further comprising a set of instructions for:

prior to submitting the received packet by said flow-processing first flow table to the statistics-collecting second flow table, (i) storing an identification of the particular logical entity in a first temporary register storage, and (ii) storing the type of statistics in a second temporary register, wherein the set of instructions for updating the statistics for the particular logical entity by the statistics-collecting second flow table comprises a set of instructions for (i) using the first and second temporary storage registers to match the matching criteria of a flow entry in the statistics-collecting second flow table, and a set of instructions for (ii) updating the statistics collected by the matched flow entry.

14. The non-transitory computer readable medium of claim 8, wherein the statistics type is one of a number of received packets, a number of packets dropped, a numbered of packets dropped for each particular security reason, and a number of bytes received.

15. A system comprising:
a set of processing units; and
non-transitory computer readable medium storing a program for collecting statistics for a set of logical entities associated with a flow-based managed forwarding element executing on one computer, the program executable by a processing unit in the set of processing units, the program comprising sets of instructions for:

creating a flow-processing first flow table for processing received packets and a statistics-collecting second flow table for collecting statistics for a set of logical entities on one computer;

adding, for each pair of logical entity and collected statistics type, a flow entry to the statistics-collecting second flow table, each added flow entry comprising a set of matching criteria comprising (i) an identification of the logical entity corresponding to the flow entry and (ii) a type of the statistics collected by the flow entry;

submitting, when a first type of statistics for a particular logical entity is to be updated during the processing of a received packet by the flow-processing first flow table, the received packet from the flow-processing first flow table to the statistics-collecting second flow table; and updating, at the statistics-collecting second flow table, the first type of statistics for the particular logical entity by matching the identification of the particular logical entity and the first type of statistics with the matching criteria of a flow entry in the statistics-collecting second flow table.

16. The system of claim 15, the program further comprising a set of instructions for adding a set of note actions to each flow entry in the statistics-collecting second flow table to identify the statistics collected by the flow entry, the set of note actions comprising the identification of the logical entity corresponding to the flow entry and the type of statistic s collected by the flow entry for the corresponding logical entry.

17. The system of claim 16, the program further comprising sets of instructions for:

retrieving each statistics type for each logical entity from a corresponding flow entry of the statistics-collecting second flow table based on the note actions of the corresponding flow entry; and sending the retrieved statistics to a management plane of the flow-based managed forwarding element.

18. The system of claim 15, wherein the set of instructions for submitting the received packet by said flow-processing first flow table to the statistics-collecting second flow table comprises a set of instructions for sending the received packet to a processing pipeline of the flow-based managed forwarding element with a request to submit the received packet to the statistics-collecting second flow table.

19. The system of claim 15, the program further comprising a set of instructions for submitting the received packet back from the statistics-collecting second flow table to said flow-processing first flow table processing the received packet to resume the processing of the received packet.

20. The system of claim 15, the program further comprising a set of instructions for:

prior to submitting the received packet by said flow-processing first flow table to the statistics-collecting second flow table, (i) storing an identification of the particular logical entity in a first temporary register storage, and (ii) storing the type of statistics in a second temporary register, wherein the set of instructions for updating the statistics for the particular logical entity by the statistics-collecting second flow table comprises a set of instructions for (i) using the first and second temporary storage registers to match the matching criteria of a flow entry in the statistics-collecting second flow table, and a set of instructions for (ii) updating the statistics collected by the matched flow entry.

* * * * *